United States Patent [19]

Moyden et al.

[11] Patent Number: 5,372,473
[45] Date of Patent: Dec. 13, 1994

[54] AUTOMATIC TRAY LOADING, UNLOADING AND COMPENSATING SYSTEM

[75] Inventors: Andrew E. Moyden, Hinsdale; Richard P. Hoinacki, Oak Lawn, both of Ill.

[73] Assignee: Fleetwood Systems, Inc., Countryside, Ill.

[21] Appl. No.: 984,181

[22] Filed: Nov. 20, 1992

[51] Int. Cl.⁵ ............................................. B65H 3/00
[52] U.S. Cl. ................................ 414/788.4; 414/751; 414/792.9; 414/796.9
[58] Field of Search ............... 198/347.1, 347.2, 347.3, 198/347.4; 414/788.2, 795.2, 794.9, 797.5, 751

[56] References Cited

U.S. PATENT DOCUMENTS

| | | | |
|---|---|---|---|
| 3,858,732 | 1/1975 | Kemper | 414/795.2 |
| 4,056,916 | 11/1977 | Seragnoli | 198/347.3 |
| 4,229,137 | 10/1980 | Molins | 198/347.1 |
| 4,568,231 | 2/1986 | Czajka et al. | 414/32 |
| 4,702,660 | 10/1987 | Miehaus et al. | 414/795.2 |
| 4,808,057 | 2/1989 | Chiappe et al. | 414/267 |
| 4,865,515 | 9/1989 | Dorner et al. | 414/797.5 |
| 4,979,870 | 12/1990 | Mojden et al. | 414/788.4 |

FOREIGN PATENT DOCUMENTS 0141938  1/1987  European Pat. Off.
3203757  8/1983  Germany ................ 414/795.2
201723   9/1987  Japan .................... 198/347.1

Primary Examiner—Michael S. Huppert
Assistant Examiner—Gregory A. Morse
Attorney, Agent, or Firm—Trexler, Bushnell, Giangiorgi & Blackstone, Ltd.

[57] ABSTRACT

An article handling method is provided for receiving articles such as can ends or the like, or similarly shaped disk-like articles supplied in elongate stacks from a first location, for loading the stacks of articles into trays for selectively storing the same for subsequent use and for unloading the stacks of articles from trays for transport to a second location so as to compensate for diffrences between a rate of supply of articles at a first location and a rate of demand for articles at a second location. The method includes receiving a plurality of stacks of articles at an infeed station; accommodating an article-holding tray for accommodating a plurality of stacks of articles at a working station; for receiving stacks of articles from a tray and delivering the stacks of articles to a second location at an outfeed station; locating the working station between the infeed station and the outfeed station; removing stacks of articles from the infeed station for discharge into a tray located in the working station, and placing the stacks of articles removed from the tray located in the working station into the outfeed station. An article handling system includes apparatus for carrying out this method.

15 Claims, 7 Drawing Sheets

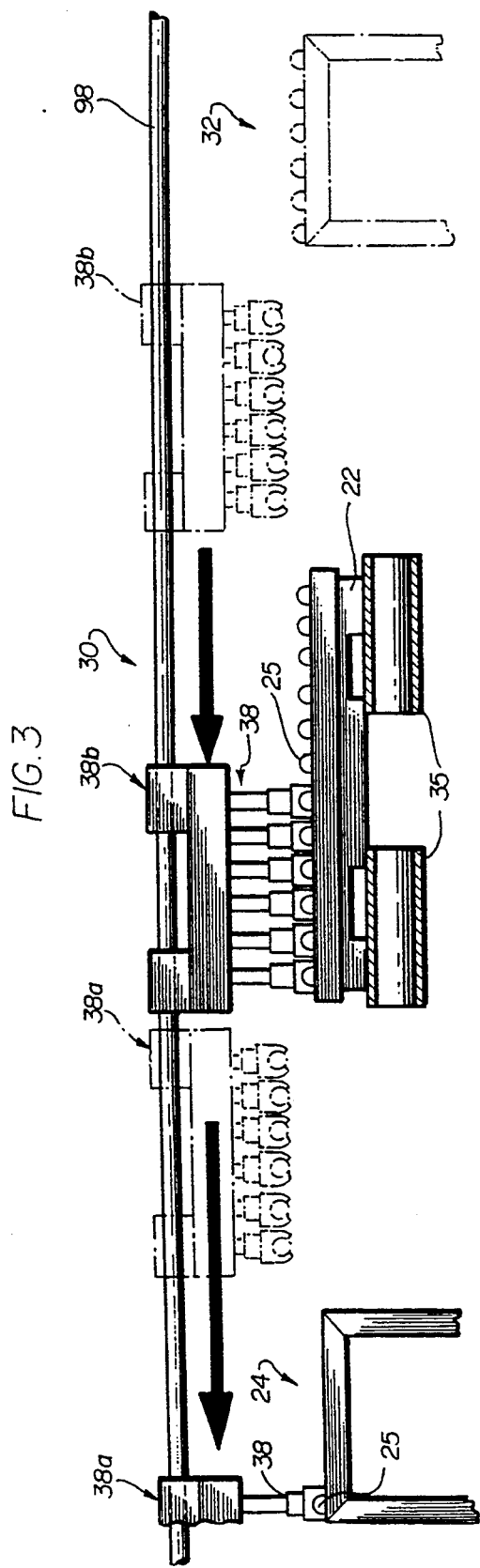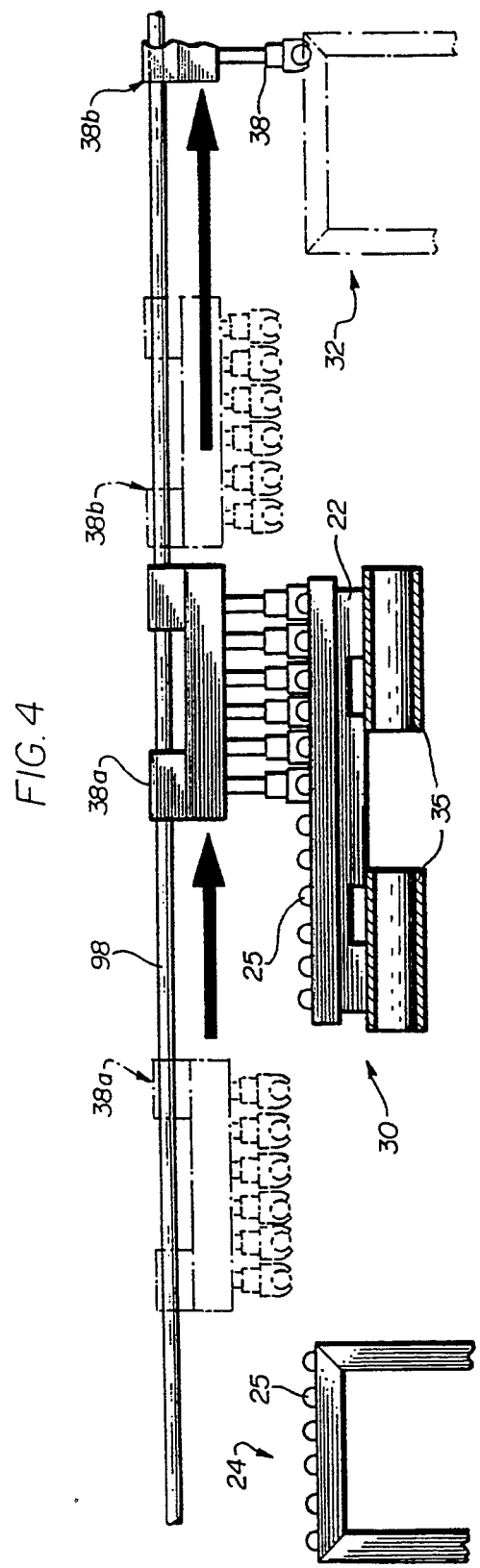

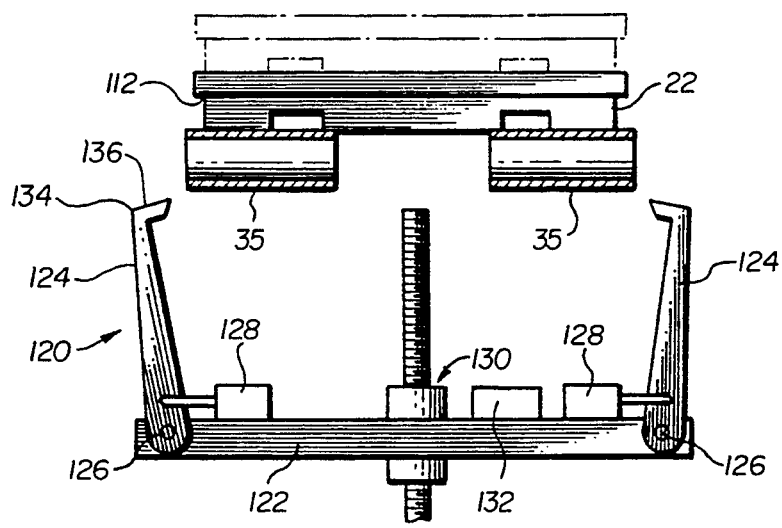
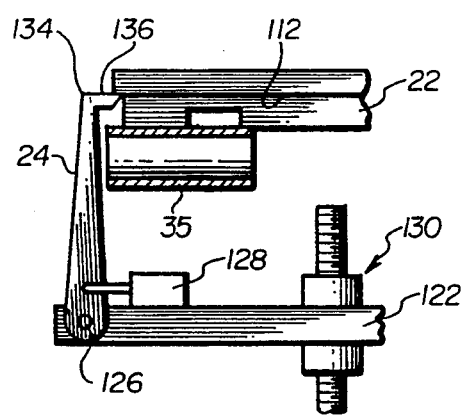
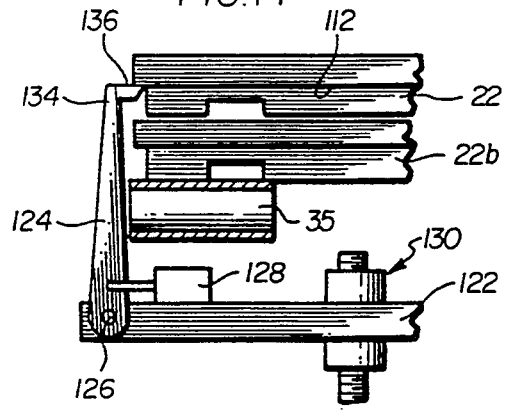
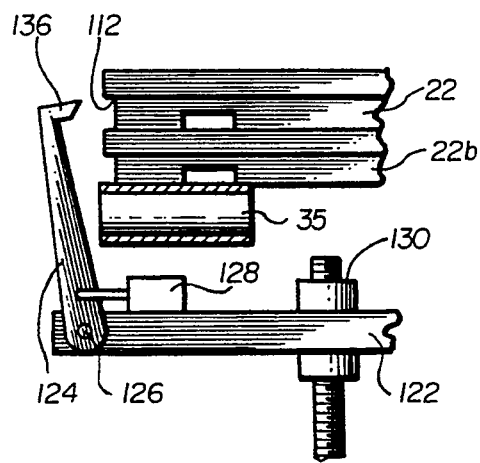
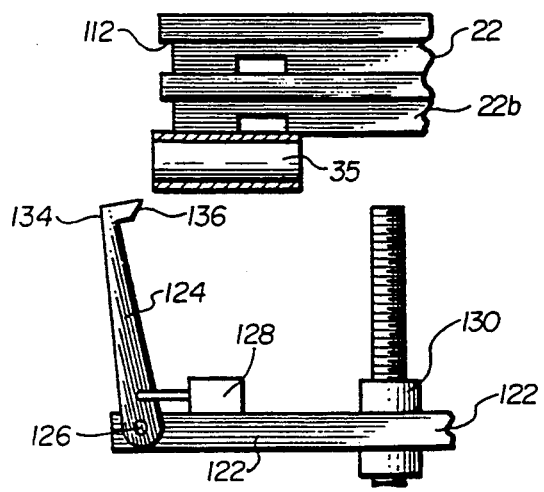

AUTOMATIC TRAY LOADING, UNLOADING AND COMPENSATING SYSTEM

BACKGROUND OF THE INVENTION

This invention is directed to article handling apparatus, and more specifically to apparatus for loading and unloading a plurality of like articles with respect to a plurality of trays for storage and/or transport between various handling and/or utilization stations.

While apparatus in accordance with the invention may find utility in a number of applications, the ensuing description will be facilitated by particular reference to a system for handling can ends.

In the manufacture of containers such as beverage cans or the like, a great number of can end parts are required. Generally speaking, modern aluminum beverage container bodies present but a single open end and hence require but a single end closure piece or "can end", as they are called in the trade. Apparatus have heretofore been devised for handling, stacking, packaging and unpackaging can ends during their manufacture and for their further processing, both prior to and up to their final assembly with can bodies. A number of individual steps or stations can be utilized in processing can ends prior to this final assembly. For example, at one station, the ends may be suitably cleaned and sterilized for use in beverage or other food containers. At yet another station a protective inner lining material or substance may be applied for use in some beverage and food container applications. Yet another operation may involve the fitting of pull rings or tabs to tear-away openings or the like, as in the case of so called "flip-top" or "pop-top" type containers.

Accordingly, modern container preparation and assembly operations require that numerous relatively small disk-like can ends be transported from one station to the next in a more-or-less continuous process up to, and including, the final assembly thereof with can bodies. Generally speaking, however, such final assembly does not take place until the filling of the container or body by the end user. Accordingly, processing of the can ends separate from the can bodies prior to the filling process is generally contemplated.

It should also be appreciated that modern can ends have a slight curl or lip, as well as the frequently present tear-away top portion with graspable tab, ring, or the like. The lips or curls tend to make can ends nestable in generally flat, coaxial, side-by-side arrangement. However, the tabs or rings tend to cause the can ends to tilt or cant somewhat. That is, the graspable tabs or rings for removing the tear-away opening tend to impart a spring-like action to a stack of otherwise nested or closely axially placed ends, which tends to cause the ends to spread apart somewhat and at least the endmost members to tilt or cant, or perhaps come apart entirely from the remaining members of a stack.

Furthermore, it has become important to provide a reasonably accurate count of can ends for handling in individual, predictably-sized groups or stacks, or, as they are called in the art "sticks". It should be appreciated that modern operations require that on the order of hundreds and sometimes even thousands of ends be processed per minute to maintain the desired efficiency of operation. Accordingly, it will be appreciated that the accurate and rapid handling of large numbers of groups or sticks of can ends is an important consideration in achieving such efficient operation. Needless to say, errors in counting and handling and transporting such can end sticks or groups can damage equipment and/or cause a shutdown of extremely large and expensive processing systems or factories. The attendant delay can be extremely costly in terms of idle personnel and machinery, as well as in terms of delayed processing of product, such as by causing failure to meet required delivery dates or the like.

Accordingly, we have devised novel and patented machinery and other apparatus for facilitating the accurate and rapid handling of large numbers of can ends. Examples of these modern can end handling systems are shown for example in a number of prior patents which are assigned to the assignee of this application, for example: Mojden et al. U.S. Pat. Nos. 3,165,218; 3,337,064; 3,523,602; 3,545,631; 3,595,372; 3,618,550; 3,722,741; 3,754,635; 3,878,945; 4,000,709; 4,364,466; 4,537,010; 4,537,550; 4,580,938; and 4,979,870.

We have now developed a novel and improved automatic tray loading and unloading and storage system for can ends, which advantageously is adapted in effect, to compensate for differences in the supply and flow of can ends between one station and the next in a multiple station processing plant as described hereinabove. Advantageously, our system greatly facilitates such overall compensation between various stations by permitting automatic loading of ends upon processing thereof at one station onto pallet-sized trays, which may then be readily transported by normal pallet handling methods and apparatus to one or more other stations for further processing of the can ends.

Advantageously, our system permits ready storage of excess can ends from one station until they are needed for further processing at other stations. Hence, any oversupply or shortage developed because of a shutdown or slow down of one station in a multiple station operation need not affect the continued operations of the remaining stations. Hence, our novel system permits the above-described compensation in a multiple station processing plant to thereby optimize the efficiency of operation within the plant. In effect, our system compensates between varying rates of supply of can ends as they are delivered from any given processing station and different and also varying rates of demand for can ends at other processing stations. That is, any excess supply is absorbed, and any shortage is made up, by our system.

OBJECTS AND SUMMARY OF THE INVENTION

Accordingly, it is a general object of the invention to provide an automatic tray loading and unloading system for use in a multiple station article processing operation.

A more specific object is to provide an automatic tray loading and unloading system for accommodating and compensating among multiple stations in a multiple station can end processing and handling facility.

Another object of the invention is to provide means for stacking and destacking of trays in a tray storage station.

In accordance with one aspect of the invention, there is provided an article handling method for receiving articles such as can ends or the like, or similarly shaped disk-like articles supplied in elongate stacks from a first location, for loading the stacks of articles into trays for selectively storing the same for subsequent use and for unloading the stacks of articles from trays for transport to a second location so as to compensate for differences between a rate of supply of articles at a first location and a rate of demand for articles at a second location, said method comprising: providing an infeed station for receiving a plurality of stacks of articles; providing a working station for accommodating an article-holding tray for accommodating a plurality of stacks of articles; providing an outfeed station for receiving stacks of articles from a tray and delivering the stacks of articles to a second location; removing stacks of articles from said infeed station for discharge into a tray located in said working station; discharging said stacks of articles removed from said infeed station to said tray located in said working station; removing stacks of articles from said tray located in said working station, and placing said stacks of articles removed from said tray located in said working station into said outfeed station. An article handling system includes apparatus for carrying out this method in accordance with another aspect of the invention.

In accordance with another aspect of the invention, there is provided a method of stacking and destacking trays in a tray storage station comprising: engaging a selected tray located in said tray storage station, elevating said selected tray by a predetermined distance sufficient to permit one of insertion of another tray and removal of another tray from beneath said selected tray; lowering said selected tray to a stationary rest position and releasing the engagement with said selected tray. Apparatus is provided for carrying out this method, in accordance with yet another aspect of the invention.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 3 is a partial elevational view of the system of FIG. 1 taken generally along the line 3—3 of FIG. 1, and showing further details thereof;

FIG. 4 is a view similar to FIG. 3 illustrating further aspects of the operation of the apparatus shown therein;

FIG. 12 is an elevational view, in somewhat diagrammatic form, illustrating apparatus for stacking and destacking trays; and FIGS. 13–16 are a series of partial elevational views, similar to FIG. 12, illustrating the sequence of operation of the apparatus of FIG. 12.

DETAILED DESCRIPTION OF THE ILLUSTRATED EMBODIMENT

Figure 1:
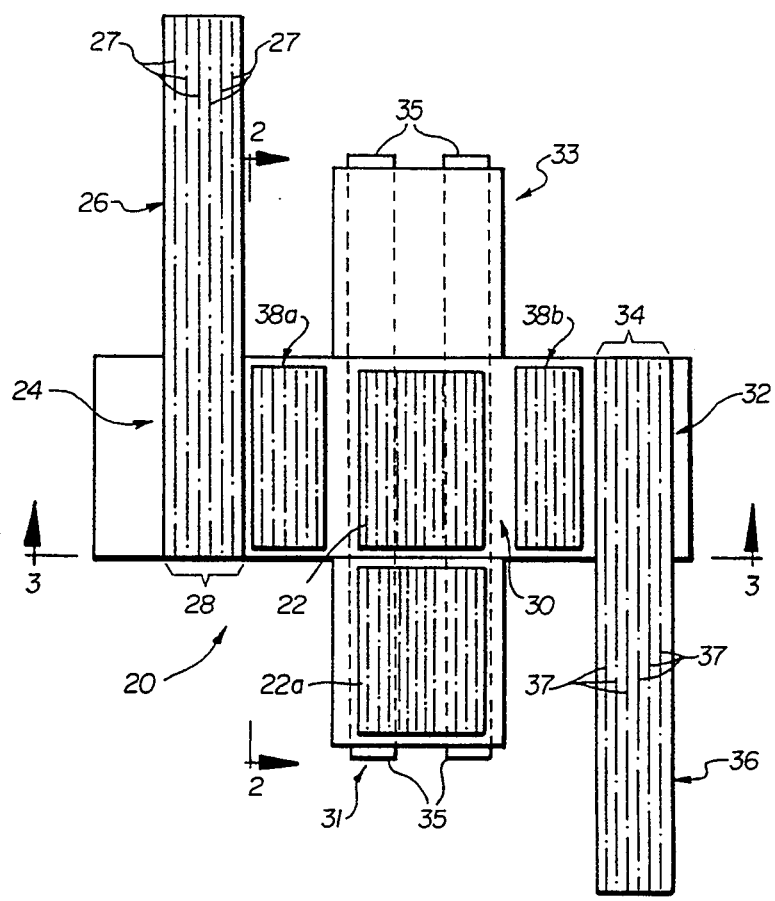
FIG. 1 is a simplified diagrammatic top plan view of an automatic loading, unloading and compensating system in accordance with the invention.

Referring now to the drawings, and initially to FIGS. 1–4, an article handling system in accordance with the invention is designated generally by the reference numeral 20. Briefly, the system 20 receives articles such as can ends or the like which are stacked in an endwise nested condition in elongate stacks and supplied from a first location (not shown). These stacks or "sticks" of can ends, as they are called in the industry, are designated generally by reference numeral 25 in FIGS. 2–4. FIG. 1 is somewhat diagrammatic in form, indicating the relative locations of major components or subassemblies of the system 20 in accordance with the invention.

Briefly, by way of background, the can ends generally undergo a number of processing steps in their formation. Initially, the ends are formed from sheets of steel or aluminum material in a shell press machine in which thousands of ends per minute are punched and the edges curled from a wide coil of coated aluminum or steel fed into a shell press. The ends emerge flat and are picked up by a vacuum and stacked into a continuous "stick" of nested ends. These ends are delivered to compound liners in which an accurate bead of sealing compound is applied in the curl of each end. The lined ends are inspected and then propelled into an oven area to complete drying of the water-based liner compound. Finally, in a conversion press, the ends are scored, pull tabs are attached and any embossing or incising is completed.

It is an object of this invention to provide article handling systems for providing a continuous flow of articles from one location to the next wherein the articles are being processed. In accordance with the specific embodiment illustrated and described immediately hereinabove, it is an object to provide a continuous supply of articles from a shell press to a compound liner and also from a compound liner to a conversion press, in the above-described can end manufacturing process.

The article handling system of the invention further operates for loading the stacks of articles into trays such as tray 22 for selectively storing the articles for subsequent use and also for unloading stacks of articles from a tray 22 for transport to a second location, such that this system may be used for compensating for differences between the rate of supply of articles between a first location and a rate of demand for articles at a second location.

In accordance with the invention, the system 20 comprises an infeed station 24 for receiving a plurality of stacks of articles from a first location. In this regard a can end infeed apparatus 26 may be used to supply the infeed station 24. Apparatus 26 includes a plurality of parallel lanes 27, each lane 27 being configured for accommodating stacks or sticks of can ends. The lanes 27 of the apparatus 26 align with a like number of lanes 28 of the infeed station 24, each of which is configured for receiving one stick of can ends 25. The configuration of these lanes 28 may be as illustrated and described in prior U.S. Pat. No. 4,979,870, the description of which is incorporated by reference herein, and to which reference is invited.

Adjacent to the infeed station 24 is a working station 30 for accommodating an article-holding tray 22. The tray 22 preferably accommodates a plurality of sticks or stacks of articles such as can ends and a generally parallel and spaced apart condition. A preferred configuration of the tray 22 is described hereinbelow with reference to FIG. 9, and is preferably similar to the article holding tray described in the above-referenced U.S. Pat. No. 4,979,870. In the embodiment illustrated for purposes of description, the lanes 27, 28 are six (6) in number while the article-holding tray 22 is configured for accommodating a total of twelve (12) stacks of articles. However, each of these elements may accommodate fewer or more stacks of articles without departing from the invention.

The system of the invention further includes an outfeed station 32 which is of generally similar if not identical configuration to infeed station 24 and includes a plurality of outfeed lanes 34, each configured for accommodating one stick of can ends 25. These outfeed lanes 34 which feed into a like plurality of lanes 37 of an outfeed apparatus 36 which is substantially identical to the infeed apparatus 26. Preferably the outfeed lanes 34, 37 are also six (6) in number, however, the fewer or more such lanes may be provided without departing from the invention. The outfeed station 32 generally receives articles from a tray 22 in the working station for delivery by means of the outfeed apparatus 36 to a second location. In the example given hereinabove, the infeed station 24 may receive by way of the apparatus 26 can ends from the shell press while outfeed station 32 supplies ends by way of apparatus 36 to a compound liner. On the other hand, the infeed station may receive ends from a compound liner and the outfeed station 32 may supply ends to a conversion press.

The article handling system 10 further includes a plurality of pick-and-place devices 38 each of which is adapted to engage in thereafter discharge a stack of articles. These pick-and-place devices 38 are generally arranged in two groups 38a and 38b, with the devices of the group 38a adapted to transfer articles from the infeed station 24 to the tray 22 and the devices of the group 38b being arranged and located for transferring articles from a tray 22 to the outfeed station 32. Operating means 40 are provided for moving respective ones of the pick-and-place devices 38 into positions overlying a tray 22 in the working station 30, and overlying the infeed station 24 and the outfeed station 32, respectively. Control means 42 (shown diagramatically in FIG. 2) are provided for controlling the operating means 40 and the pick-and-place devices 38 to remove stacks of articles from the infeed station 24, to discharge stacks of articles into a tray 22, to remove stacks of articles from a tray 22 and to place stacks of articles into the outfeed station 32, respectively.

As indicated above, the operating means 40 operate the pick-and-place devices of the first or infeed group 38a for movement between the infeed station and the working station for removing stacks of articles 25 from the infeed station and discharging stacks of articles 25 into a tray 22 in the working station 30. Similarly, the operating means 40 operate the pick-and-place devices of the outfeed group 38b for movement between the working station 30 and outfeed station 32 for removing stacks of articles 25 from a tray 22 located in the working station 30 and placing stacks of articles 25 into the outfeed station 32.

In accordance with another aspect of the invention, the control means 42 is preferably arranged for controlling the operating means and 40 and the pick-and-place devices 38 such that the pick-and-place devices 38 are operated individually for removing stacks of articles from the infeed station and for placing stacks of articles in the outfeed station respectively, but such that the pick-and-place devices of each group 38a, 38b are operated in unison for discharging stacks of articles into a tray 22 and for removing stacks of articles from a tray 22, respectively. This operation is more clearly shown in FIGS. 3 and 4 of the drawings.

It will be noted that in FIG. 3 the pick-and-place devices 38 of the infeed group 38a operate individually to acquire stacks of articles from the infeed lanes 28 until each of the pick-and-place devices of the infeed group 38a has acquired a stack of articles. Thereafter, and as illustrated in FIG. 4, the pick-and-place devices of the infeed group 38 move in unison so as to deposit all of the previously acquired stacks of articles in unison into article-receiving pockets in the tray 22. This same operation is also seen with respect to the pick-and-place devices 38 of outfeed group 38b. Namely, in FIG. 3 the pick-and-place devices of outfeed group 38a operate in unison to simultaneously acquire stacks of articles from the tray 22. However, as shown in FIG. 4 the pick-and-place devices of the outfeed group 38b operate individually to deposit or deliver groups of articles into each lane of the outfeed lanes 36. Moreover, the pick-and-place devices 38a and 38b are movable by the operating means such that any pick-and-place device 38 of infeed group 38a may acquire a stack of articles from any lane 28 of the infeed station 24, and similarly, such that any pick-and-place device 38 of outfeed group 38b can deposit a stack of articles into any one of the lanes 34 of the outfeed station 32.

Thus, if for example only one of the infeed lanes 28 is receiving articles, all of the pick-and-place devices 38 of infeed group 38a may acquire stacks of articles from this single lane 28. Similarly, if articles are being demanded or called for downstream from only one of the lanes 34 of the outfeed station 32, the pick-and-place devices 38 of the outfeed group 38b may operate in sequence such that all deposit their stacks of articles into this single outfeed lane 34. Preferably, however, the pick-and-place devices 38 of the respective groups 38a and 38b operate on a demand basis with respect to the respective infeed lanes 28 and outfeed lanes 34, with each pick-and-place device respectively acquiring a stack of articles or depositing a stack of articles in accordance with which of the lanes 28 or 34 presents or calls for a stack of articles, respectively. This mode of operation is similar to that described in the above-referenced U.S. Pat. No. 4,979,870.

Moreover, in accordance with a preferred feature of the invention, it will be seen that the operating means is capable of positioning the pick-and-place devices of the infeed group 38a for depositing articles into either a right-hand half or a left-hand half of the tray 22. Similarly, the operating means is capable of positioning the pick-and-place devices of outfeed group 38b for acquiring articles from either the left-hand half or the right-hand half of the tray 22. In this regard, in the preferred embodiment here illustrated, each of the groups of pick-and-place devices 38a and 38b comprise six (6) individual pick-and-place devices 38 and the tray 22 contains channels or pockets for accommodating a total of twelve (12) stacks of articles. Other arrangements may be utilized without departing from the invention, however it is preferred that the article tray accommodate twice the number of stacks of articles as each of the infeed group and outfeed group 38a, 38b of pick-and-place devices.

Figure 5:
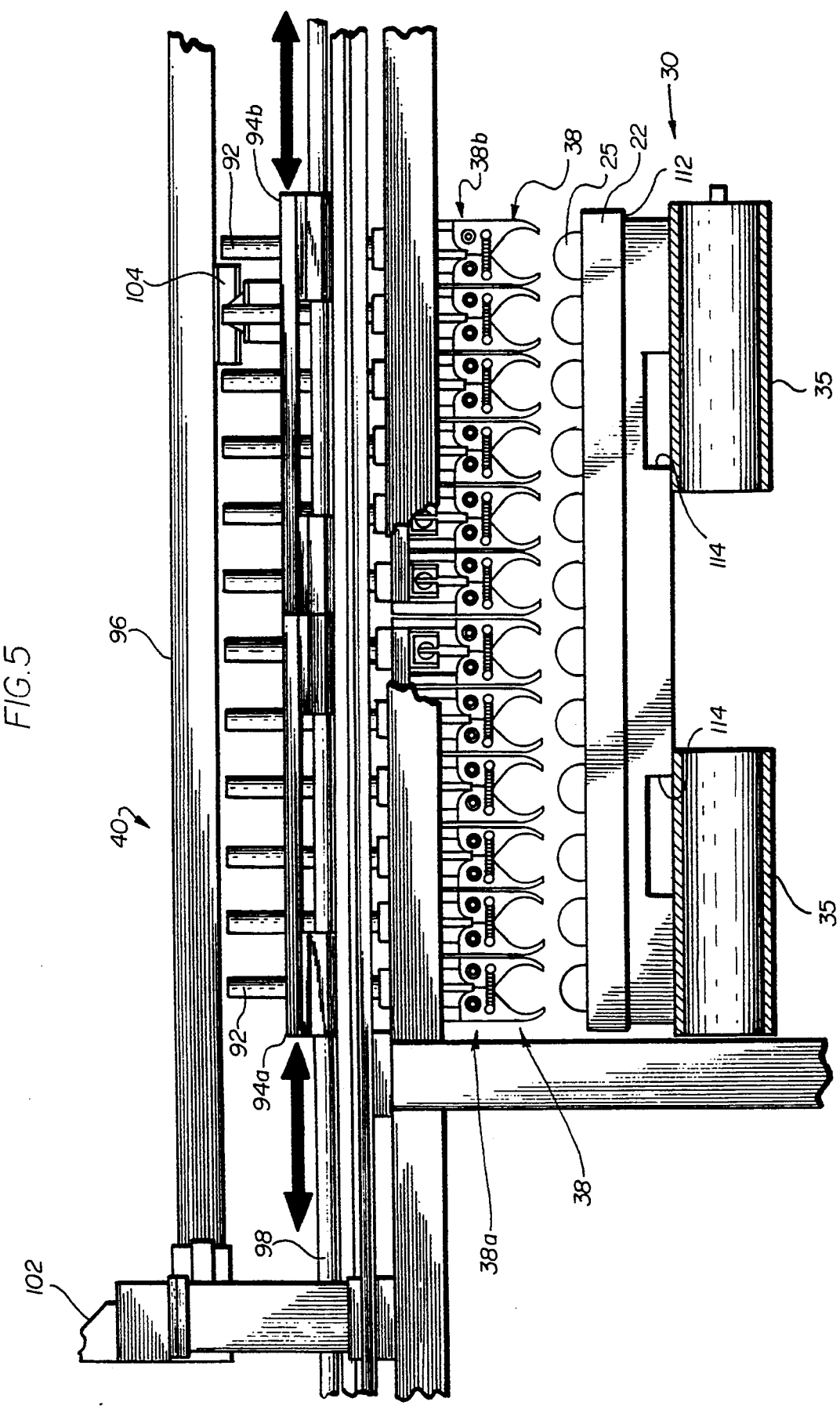
FIG. 5 is an enlarged partial elevation showing a portion of the apparatus of the invention.

Thus, the pick-and-place devices of group 38a may deliver articles to one half of the pockets of the tray to either side of the center thereof, that is either the six pockets closest infeed station 24 or the six pockets closest to outfeed station 32. Similarly, the pick-and-place devices of outfeed group 38b may remove articles from one-half of the pockets of tray 22 to either side of the center thereof, that is, the six pockets closest to infeed station 24 or the six pockets closest to outfeed station 32. Moreover, the pick-and-place devices of the infeed group 38a and outfeed group 38b, as best viewed in FIG. 5, are of complementary configuration such that the pick-and-place devices of the infeed group can discharge articles with respect to a tray 22 simultaneously with the pick-and-place devices of outfeed group 38b removing stacks of articles from this same tray 22. In such an event, the pick-and-place devices of each of the two groups operates with respect to the nearer half of the pockets of tray 22 such that the two groups of devices 38a and 38b meet at the middle of tray 22, as illustrated in FIG. 5.

Reference is now invited to FIGS. 5-8 in which a preferred form of the pick-and-place devices 38, the groups 38a, 38b and operating means 40 are illustrated. Preferably, the configuration of the pick-and-place devices and of the operating means 40 are substantially similar to that illustrated and described in the above-referenced U.S. Pat. No. 4,979,870, which description is incorporated by reference herein and hence these structures need not be described in detail herein.

Figure 6:
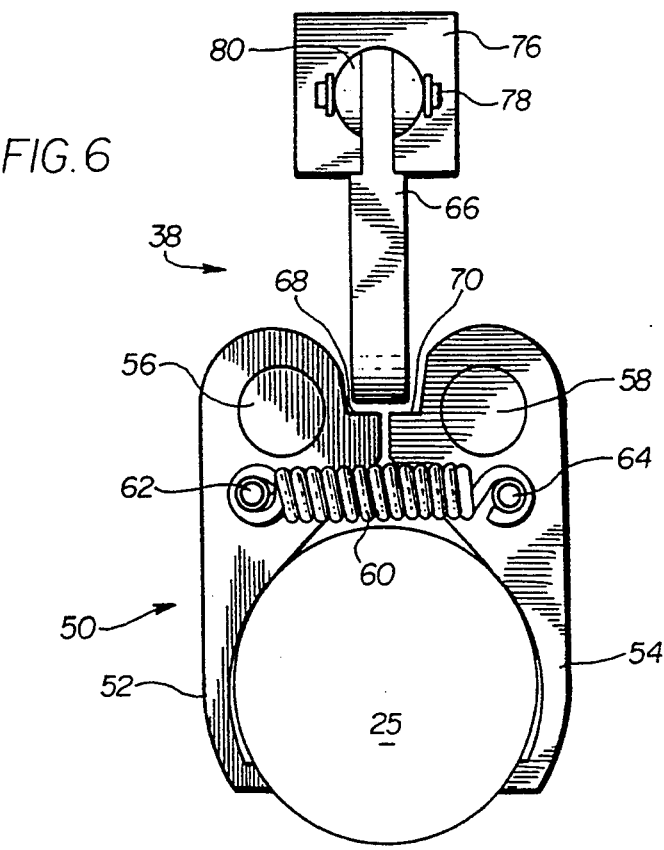
FIG. 6 is a further enlarged, partial end view showing further details of a pick-and-place device forming a part of the system of the invention.
Figure 7:
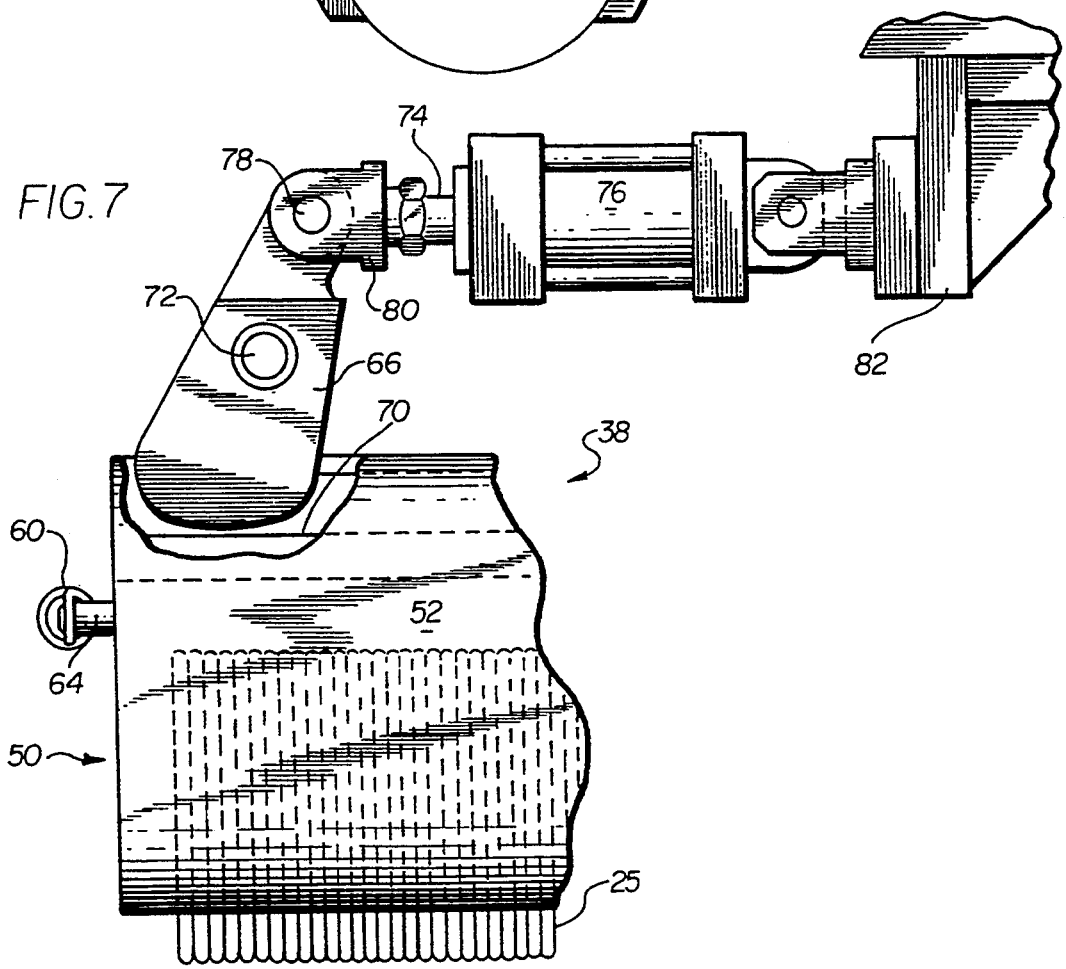
FIG. 7 is a partial side elevation of the pick-and-place device shown in FIG. 4.

Referring first to FIGS. 6 and 7, each pick-and-place device 38 comprises a gripping portion or means 50 for simultaneously gripping all of the members of each group of articles or stack of can ends 25. Gripping means 50 include a pair of elongate jaws or jaw-like members 52, 54 which are pivotally mounted at respective pivot shafts 56, 58, and are spring biased for moving inwardly toward each other to grippingly engage the articles 25 by a tension spring 60 coupled to respective bosses or pins 62, 64 which project outwardly of respective end surfaces of each of the jaws 52, 54. The jaws 52, 54 may be urged apart for either releasing or surroundingly receiving a group of can ends 25 by the action of a cam member 66 upon respective camming surfaces 68, 70 of the jaws 52, 54. Cam member 66 is pivotally mounted at a pin or shaft 72. The cam member 66 is rotated or pivoted about shaft 72 by means of a piston 74 driven by a cylinder 76. Piston 74 is pivotally mounted to an end of the cam 66 opposite its end which engages cam surfaces 68, 70, by a pivot pin 78 and a fitting 80. Piston 76 is in turn mounted to a frame or frame like portion 82 of an operating means 40. In the preferred embodiment illustrated the above-described mechanism for opening and closing the jaws 52, 54 is provided at only one longitudinal end thereof; however, a similar mechanism may be provided at the opposite longitudinal end if desired.

Figure 8:
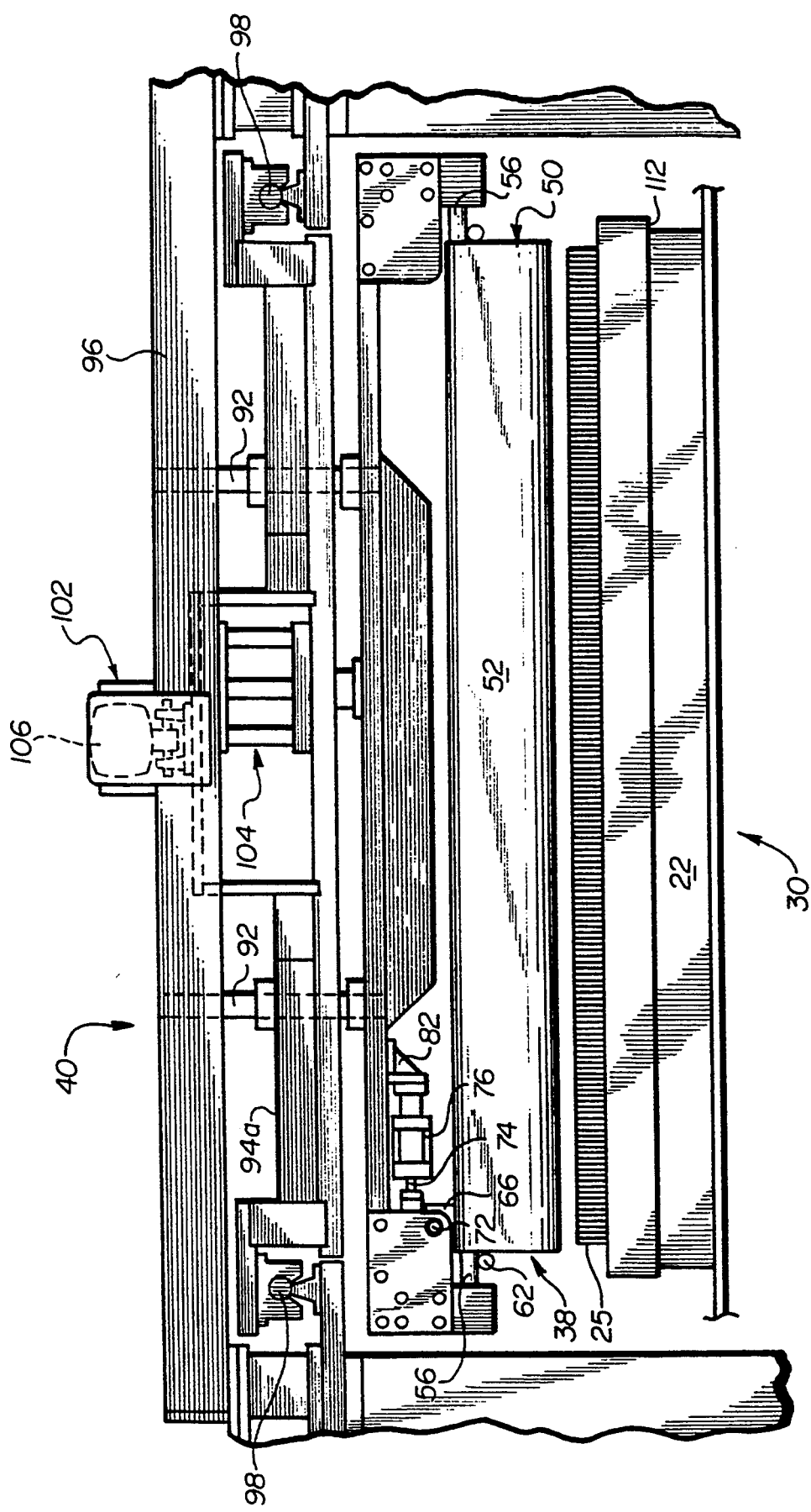
FIG. 8 is a partial side elevation of a portion of the apparatus of the invention.

Referring to FIGS. 5 and 8, the individual pick-and-place devices 38 are mounted for individual vertical motion on separate vertical shafts 92. This structure is preferably substantially similar to that illustrated and described in the above-referenced prior U.S. Pat. No. 4,979,870. These shafts 92 are mounted for individual bidirectional vertical motion with respect to respective frame members 94a and 94b which are in turn mounted for simultaneously lifting and lowering all of their associated pick-and-place devices or units 38, that is the pick-and-place devices 38 of the groups 38a and 38b, respectively. Moreover, the frames 94a and 94b are commonly mounted for horizontal motion along a pair of elongate bar rods or tracks 98 which extend the full width of the system. Preferably the rods or tracks 98 extend somewhat outwardly of the extreme outer end edges of the infeed stations 24, 32, such that any of the pick-and-place devices 38 of the associated groups 38a or 38b can retrieve can ends from any of the lanes 28 or 34 of the respective infeed and outfeed lanes, as indicated in FIGS. 3 and 4.

The frames 94a, 94b in turn are mounted to a main frame assembly 96 by means of an overhead track 102 which further suspends a plurality of pneumatic cylinders 104 for individually lifting and lowering each of the pick-and-place units 38, with this movement being stabilized or guided by the vertical shafts 92. One such cylinder 104 is provided for each pick-and-place device 38. The horizontal motion and indexing of the pick-and-place units relative to both respective infeed and outfeed stations 24, 32 as well as with respect to a tray 22 in the working station 30 are controlled by a linear actuator 106 mounted in the overhead track 102. One such linear actuator 106 is provided for each of the frames 94a and 94b in this regard. These actuators 106 may be Origa cylinders as are produced by Origa Corporation, 928 Oaklawn, Elmhurst, Ill. 60126 and designated Origa Electric Cylinder, or ball screws or belt-driven actuators driven by servo motors.

Figure 9:
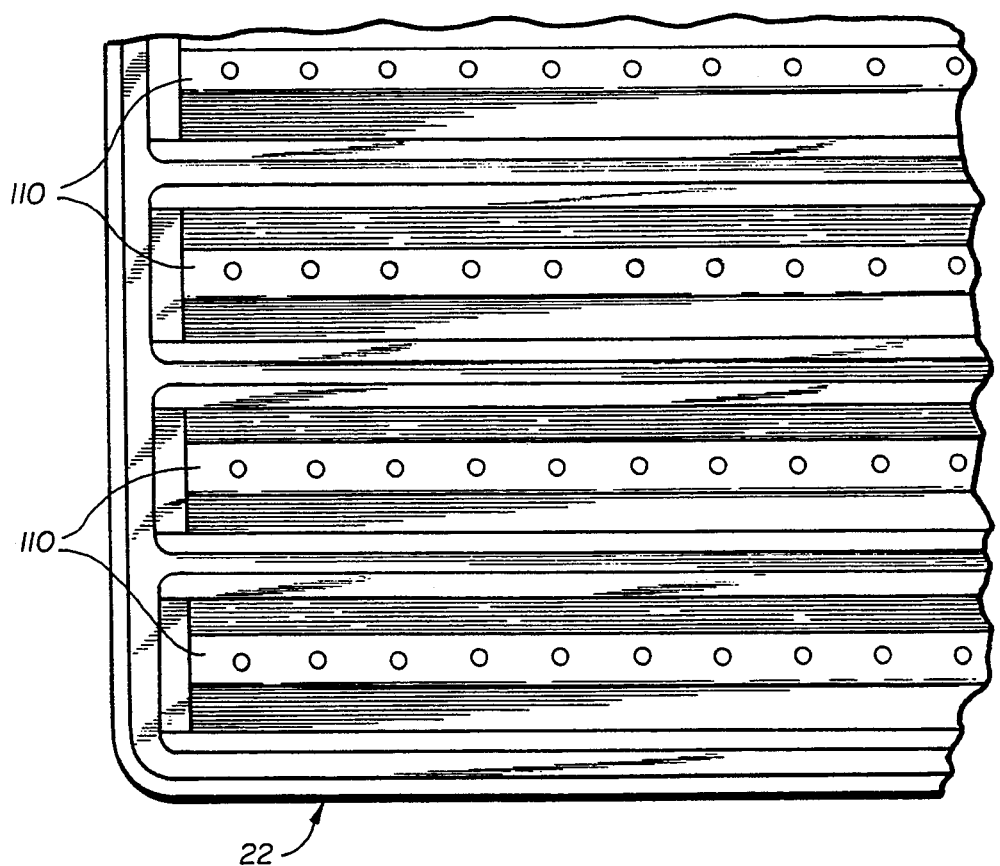
FIG. 9 is a partial top plan view showing further details of a tray member in connection with which the invention may be utilized.

Turning now to FIG. 9, a top plan view of a portion of a typical tray 22 is illustrated. The trays 22 have individual pockets or channels 110, each for accommodating one stack or stick of can ends 25. The trays 22 and their pockets 110 are configured for cooperating with the pick-and-place devices 38. Thus, the configuration and spacing of the pockets 110 provides sufficient clearance space between respective groups of articles 25 when in the pockets 110 to permit adjacent parallel gripping jaw members 50 of adjacent pick-and-place devices 38 sufficient clearance to enter the tray and open and close for surroundingly engaging or releasing respective sticks or groups of can ends 25 without interfering with each other. That is, clearance space is provided in the trays for simultaneously loading and unloading groups or sticks of articles 25 with respect to the individual pockets 110 thereof by pick-and-place devices 38 acting in unison as described hereinabove.

Suitable control means (diagramatically shown at 42 in FIG. 2) are provided for controlling the operation of the pick-and-place devices in the fashion described above. Suitable sensors (not shown) are also preferably provided for the respective lanes of the infeed station and outfeed station respectively to sense the presence or absence of can ends thereat and thereby help coordinate operation of the pick-and-place devices relative thereto. The control means 42 operate in connection with the pick-and-place devices and the operating means 40 for operating the pick-and-place devices relative to the infeed station, the outfeed station and the working station as described hereinabove.

Referring again briefly to FIG. 1, in order to accommodate empty trays and filled trays, respectively, an empty tray station 31 and a filled tray station 33 are respectively provided to either side of the working station 30. Thus, an empty tray may be provided from the empty tray station 31 to the working station 30 in the event that the rate of supply of articles at the infeed station 24 exceeds the rate of demand for articles at the outfeed station 32. In the alternative, the empty tray station 31 may receive an empty tray from the working station 30 in the event the rate of demand for articles at the outfeed station 32 exceeds the rate of supply of articles at the infeed station 24. Cooperatively, the full tray station 33 provides a full tray to the working station in the latter case, that is when the rate of demand for articles the outfeed station 32 exceeds the rate of supply at the infeed station 24. Similarly, the full tray station 33 may also receive a filled tray from the working station 30 in the event the rate of supply at infeed 24 exceeds the rate of demand at outfeed station 32. In the illustrated embodiment, the empty tray station and full tray station are shown as accommodating a total of six (6) trays in a stacked condition. More or fewer trays may be provided for without departing from the invention. As will be more fully discussed below, the trays are configured for stacking in the fashion indicated in FIG. 2.

Figure 2:
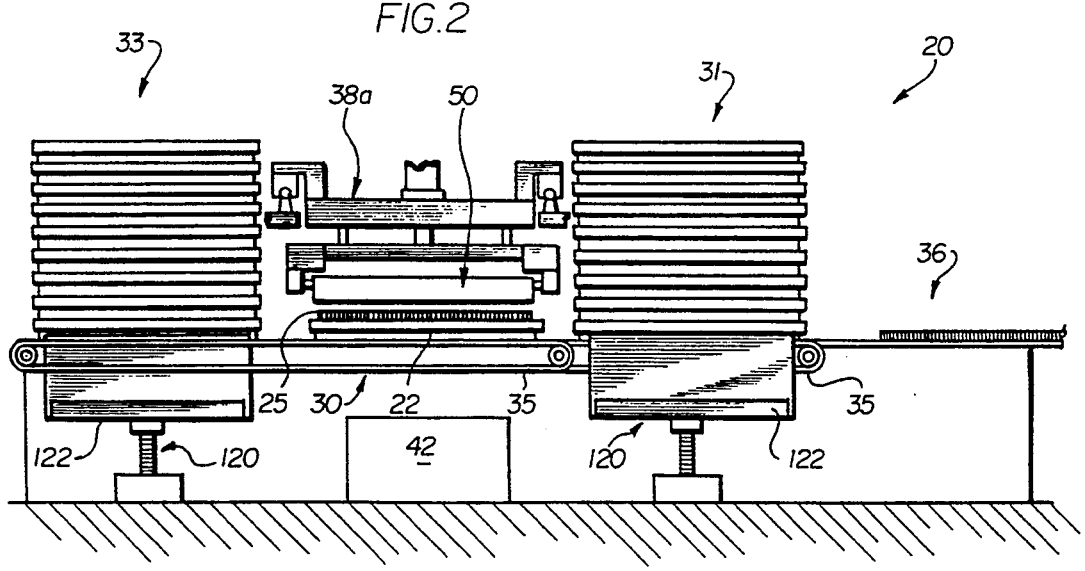
FIG. 2 is a partial elevational view of the system of FIG. 1 taken generally along the line 2—2 of FIG. 1, and showing further details thereof.

In order to transport trays between the full tray station or the empty tray station and the working station, respectively, there is provided a conveyor or conveyor means 35 in the form of a pair of spaced conveyor members. These conveyor members 35 may comprise roller type conveyors or, as illustrated in FIG. 2, belt type conveyors. The conveyors may be driven, or alternatively may be non-driven with some suitable additional tray engaging means (not shown) provided in the space between the conveyors 35 for moving the trays along conveyors 35 between the various stations 30, 31 and 33 as required, in operation.

As indicated hereinabove, the trays are advantageously configured for stacking as shown in FIG. 2, for example. To this end and as best viewed in FIG. 5, trays are configured for nesting with respect to each other in that outer end surfaces have a stepped back configuration as indicated at reference numeral 112. These steps or lips 112 further provide an area for gripping or engaging the trays for purposes of stacking and unstacking relative to the empty tray station 31 and full tray station 33 as will be described hereinbelow. Additional cutouts or openings 114 are also preferably provided in each tray and are advantageously located and configured to accommodate a forklift for engaging and transporting one or more trays to and from the tray loading and unloading system 20 of the invention, as may be required or desired in providing additional full trays or empty trays or in removing excess full or empty trays relative to the full tray station 33 and empty tray station 31, respectively.

Figure 10:
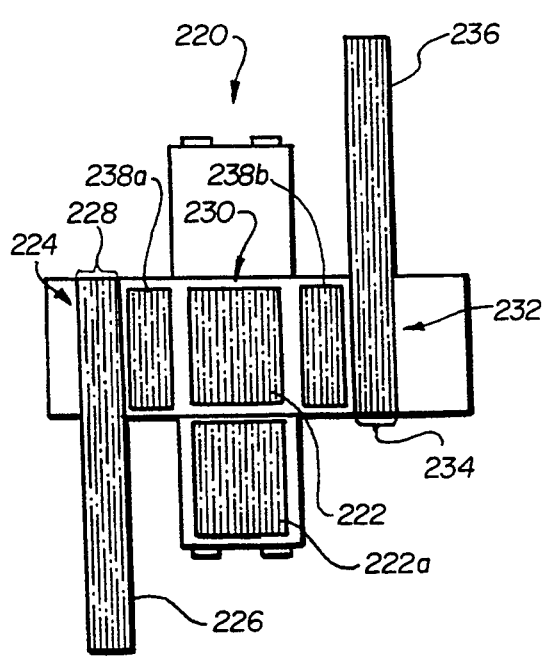
FIGS. 10 and 11 are simplified reduced views, similar to FIG. 1, showing alternate arrangements of the parts of the system thereof.
Figure 11:
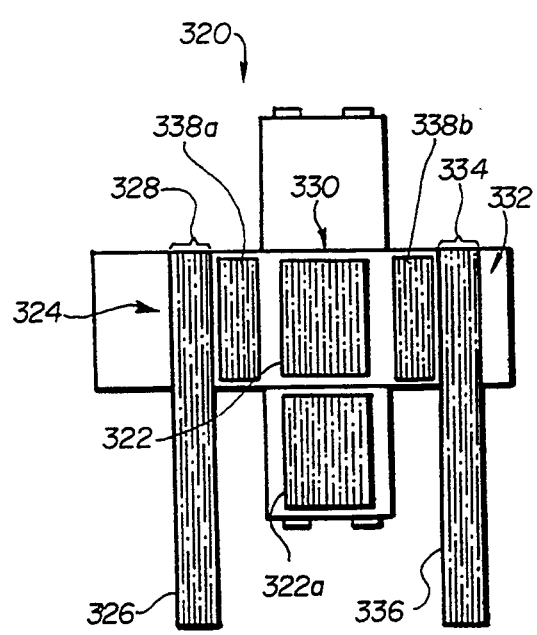

Turning now briefly to FIGS. 10 and 11, the configuration of the system of FIG. 1 advantageously permits the positioning and orientation of infeed and outfeed lanes with respect to the infeed and outfeed stations in a number of different orientations. Moreover, either side of the working station may comprise an infeed station or outfeed station without departing from the invention. Thus, FIG. 10 illustrates infeed or outfeed lanes configured generally oppositely to the placement and configuration shown in FIG. 1. FIG. 11 illustrates respective infeed or outfeed lanes both to one side of the system. It will be appreciated that the respective infeed and outfeed lanes may both be to the opposite side of the system to that illustrated in FIG. 11 without departing from the invention.

In accordance with a further feature of the invention and referring now to FIGS. 12-16, there is provided a novel tray stacking and destacking or unstacking apparatus 120 for use with the article handling system of FIG. 1. This stacking and unstacking apparatus 120 is also indicated somewhat diagrammatically in FIG. 2, to which reference is also invited. An identical stacking and destacking apparatus is utilized with the respect to each of the full tray station and empty tray station, such that only one such apparatus is illustrated and described in FIGS. 12-15. The apparatus 120 includes a frame or frame means 122 which is located generally below the conveyor or conveyor means 35 and generally in alignment with the associated one of the full or empty tray storage stations 31 or 33. Elongate tray gripping means or members 124 are provided, preferably one to either side of frame 122, and are spaced apart by approximately the width of a tray 22. The tray gripping members or means 124 are pivotally mounted to the frame 122 at respective pivot pins or points 126 for pivotal movement generally laterally inwardly and outwardly relative to the frame 122 and also relative to tray 22 as illustrated in FIG. 12.

The gripping members 124 extend generally upwardly relative to the frame means 122, in the direction of and to opposite sides of the trays 22 in the corresponding tray storage station. Actuating means are provided for bidirectionally pivoting the tray gripping members 124 in generally lateral directions inwardly and outwardly respective to the tray 22 as illustrated in FIG. 12. In the illustrated embodiment, the actuating means comprise a pair of piston-and-cylinder members 128 which are respectively coupled to the gripping members 124 at a point somewhat above their pivot points 126. Other types of actuating mechanisms may be employed in place of the cylinders 128; such as cam arrangements, without departing from the invention.

An elevating means or mechanism 130 is provided for lifting and lowering the frame member 122 relative to the conveyors 35. In the illustrated embodiment a screw type lifting and lowering mechanism is illustrated. However, other lifting and lowering mechanisms could be substituted without departing from the invention. Finally, control means, diagrammatically illustrated at 132 are provided for controlling operation of the elevating means 130 and of the actuating means 128 for controlling a predetermined sequence of operation of the elevating means and actuating means. This operating sequence is illustrated generally in FIGS. 12-16.

Referring first to FIG. 12, it will be seen in its initial or rest position the frame 122 is at a lower or retracted position with respect to the elevating means 30, such that the gripping means 124 are below the level of the conveyors 35. Referring next to FIG. 13, the platform 122 is next elevated upwardly by the elevating mechanism 130 until an upper part 134 of the gripping member 124 reaches the level of a tray 22. In FIG. 13, this tray 22 is the bottom-most tray of a stack of trays on the conveyor 35 in the tray storage station. In this regard, the gripping means or member will be seen to be an elongate member having one end pivotally mounted at pivot point 126 to the frame 122 and a tray engaging portion 136 at its end 134 opposite the pivoted end. The tray engaging portion 136 in the illustrated embodiment comprises a generally right angled portion which defines an inwardly extending finger or projection configured for an underlying and engaging the step or lip portion 112 of a tray 22.

As illustrated in FIG. 13, when the upper end 134 of the gripping member 124 is generally in alignment with the bottom-most tray 22, the actuating means 128 is activated to pivot the tray gripping member inward so as to engage the projection or finger 136 below under the lip or step 112 of the tray 22. Thereupon, and referring to FIG. 14, the platform 122 is further elevated by the elevating mechanism 130 so as to lift the tray 22 to a sufficient distance above conveyor 35 to permit the insertion of a further similar tray 22 thereunder. Upon successful insertion of a second tray 22b beneath the tray 22 which is held by the gripping means 124, the elevating mechanism 130 may again be activated to lower tray 22 which was previously lifted back into a resting position supported by the tray 22b which has now been shifted thereunder by action of the conveyor 35. Thereupon, the actuating means 128 can be activated to pivot the gripping member 124 back outwardly as illustrated in FIG. 15. Finally, the elevating mechanism 130 lowers the frame 122 back to its rest position as illustrated in FIG. 16. This procedure may be used to move trays from the working station to one of the tray storage stations.

Viewing FIGS. 16–12 in generally reversed order, a tray may be removed from either of the tray storage stations by generally the reverse sequence of operations just given. That is, the elevating mechanism lifts the platform 122 until the end 134 of the gripping member 124 is in generally aligned with the tray 22 which is second from the bottom on conveyor 35. Thereupon the gripping members are pivoted inwardly to engage the second from the bottom tray 22 and lift the same upwardly as illustrated in FIG. 14, whereupon the bottom-most tray 22b may be removed by the conveyor 35. This procedure can be used for moving trays from a tray storage station to the working station.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An article handling system for receiving articles arranged in elongate stacks and supplied from a first location, loading said stacks of articles into tray means for selectively storing the same for subsequent use, and unloading said stacks of articles from said tray means for transport to a second location, such that said system may be used for compensating for differences between a rate of supply of articles at the first location and a rate of demand for articles at the second location, said system comprising:

an infeed station for receiving a plurality of stacks of articles from said first location;

a single working station for accommodating article-holding tray means for storage of a supply of stacks of articles;

an outfeed station for receiving articles from tray means at said single working station for delivery to a second location;

a plurality of pick-and-place devices, each adapted to engage and thereafter discharge a stack of articles;

said single working station being located between said infeed station and said outfeed station, with the path of movement of said pick-and-place devices overlying said single work station;

operating means for said pick-and-place devices for moving respective ones of said devices into positions overlying tray means located at said single working station, said infeed station and said outfeed station, respectively;

and control means for controlling the operating means and said pick-and-place devices to remove stacks of articles from said infeed station, to discharge stacks of articles into tray means located at said single working station, to remove stacks of articles from tray means at said single working station, and to deliver stacks of articles to said outfeed station, respectively;

said plurality of pick-and-place devices being arranged in a first, infeed group and a second, outfeed group;

said operating means operating the pick-and-place devices of said first, infeed group for movement between said infeed station and an overlying position with regard to said single working station for removing stacks of articles from said infeed station and discharging stacks of articles into tray means located at said single working station, and wherein said operating means operates the pick-and-place devices of said second, outfeed group for movement between said overlying position with respect to the same working station serviced by the pick-and-place devices of said first infeed group and said outfeed station for removing stacks of articles from tray means located at said single working station and for delivering said stacks of articles from said single working station to said outfeed station.

2. A system according to claim 1 wherein said control means is capable of operating the pick-and-place devices of said infeed group and said outfeed group, respectively, individually for removing stacks of articles from said infeed station and for placing stacks of articles in said outfeed station, respectively, one stack at a time and operating said pick-and-place devices of said infeed group and said outfeed group, respectively, in unison for discharging stacks of articles into a tray and removing stacks of articles from a tray, respectively, a plurality of stacks at a time.

3. A system according to claim 1 wherein each of said groups of pick-and-place devices comprises a number of pick-and-place devices which are one-half of a number of stacks of articles which can be accommodated by a tray having a plurality of pockets, each for receiving one stack of articles.

4. A system according to claim 3 wherein said operating means operates the pick-and-place devices of said infeed group for movement into at least two positions relative to said working station for discharging stacks of articles into one-half of the pockets located to either side of center of a tray located in said working station and wherein said operating means operates said pickand-place devices of said outfeed group for movement into at least two positions relative to said working station for removing stacks of articles from one-half of the pockets located to either side of center of a tray located in said working station.

5. A system according to claim 1 and further including an empty tray station adjacent said working station for providing an empty tray thereto in the event the rate of supply of articles at said infeed station exceeds the rate of demand for articles at said outfeed station and for receiving an empty tray therefrom in the event the rate of demand for articles at said outfeed station exceeds the rate of supply of articles at said infeed station.

6. A system according to claim 1 and further including a full tray station adjacent said working station for providing a full tray thereto in the event the rate of demand for articles at said outfeed station exceeds the rate of supply of articles at said infeed station and for receiving a full tray therefrom in the event the rate of supply of articles from said infeed station exceeds the rate of demand for articles at said outfeed station.

7. A system according to claim 5 and further including a full tray station adjacent said working station for providing a full tray thereto in the event the rate of demand for articles at said outfeed station exceeds the rate of supply of articles at said infeed station and for receiving a full tray therefrom in the event the rate of supply of articles from said infeed station exceeds the rate of demand for articles at said outfeed station.

8. A system according to claim 4 wherein the pick-and-place devices of said infeed group and said outfeed group are respectively of complementary configuration to each other, such that the pick-and-place devices of the infeed group can discharge articles with respect to a tray in said working station simultaneously with the pick-and-place devices of said outfeed group removing stacks of articles from the same tray in said working station.

9. A system according to claim 1 and further including a tray storage station located adjacent said working station, and a tray stacking and destacking apparatus comprising:
 frame means located below said tray storage station;
 tray gripping means mounted for pivotal motion relative to said frame means and extending generally upwardly therefrom and to opposite sides of said tray storage station;
 actuating means for bidirectionally pivoting said tray gripping means in a generally lateral direction;
 elevating means for elevating and lowering said frame means relative to said conveyor means;
 and control means for controlling operation of said elevating means and of said actuating means for operating in a predetermined sequence comprising elevating said frame means from a rest position, with said tray gripping means pivoted laterally oppositely outwardly a distance sufficient to clear any trays in said tray storage station as said frame means is elevated, until said tray gripping means are laterally in registry with a selected tray in said tray storage station, pivoting said tray gripping means laterally inwardly to engage said selected tray, elevating said frame means further to thereby elevate said selected tray by a predetermined distance sufficient to permit one of insertion of another tray and removal of another tray from beneath said selected tray, lowering said frame means by an amount sufficient to bring said selected tray to rest, supported independently of said tray gripping means, pivoting said tray gripping means laterally outwardly to release engagement thereof with said selected tray, and lowering said frame means to said rest position.

10. An article handling system for receiving articles arranged in elongate stacks and supplied from a first location, loading said stacks of articles into a tray for selectively storing the same for subsequent use, and unloading said stacks of articles from said tray for transport to a second location, such that said system may be used for compensating for differences between a rate of supply of articles at the first location and a rate of demand for articles at the second location, said system comprising:
 an infeed station for receiving a plurality of stacks of articles from said first location;
 a working station for accommodating an article-holding tray for holding a supply of stacks of articles;
 an outfeed station for receiving articles from a tray for delivery to a second location;
 said working station being located between said infeed station and said outfeed station;
 a plurality of pick-and-place devices, each adapted to engage and thereafter discharge a stack of articles;
 operating means for said pick-and-place devices for moving respective ones of said devices into positions overlying a tray located in said working station, said infeed station and said outfeed station, respectively;
 and control means for controlling the operating means and said pick-and-place devices to remove stacks of articles from said infeed station, to discharge stacks of articles into a tray, to remove stacks of articles from a tray, and to place stacks of articles into said outfeed station, respectively;
 wherein said plurality of pick-and-place devices are arranged in an infeed group and an outfeed group;
 wherein said operating means operates the pick-and-place devices of said infeed group for movement between said infeed station and said working station for removing stacks of articles from said infeed station and discharging stacks of articles into a tray located in said working station, wherein said operating means operates the pick-and-place devices of said outfeed group for movement between said tray station and said outfeed station for removing stacks of articles from the same said tray located in said working station and placing stacks of articles into said outfeed station, and wherein the pick-and-place devices of said infeed group and said outfeed group are respectively of complementary configuration to each other, such that the pick-and-place devices of the infeed group can discharge articles with respect to a tray in said working station simultaneously with the pick-and-place devices of said outfeed group removing stacks of articles from the same tray in said working station.

11. An article handling method for receiving articles such as can ends, or similarly shaped disk-like articles supplied in elongate stacks from a first location, for loading the stacks of articles into trays for selectively storing the same for subsequent use and for unloading the stacks of articles from trays for transport to a second location so as to compensate for differences between a rate of supply of articles at a first location and a rate of demand for articles at a second location, said method comprising:

providing an infeed station for receiving a plurality of stacks of articles;

providing a working station for accommodating an article-holding tray for accommodating a plurality of stacks of articles;

providing an outfeed station for receiving stacks of articles from a tray and delivering the stacks of articles to a second location;

locating said working station between said infeed station and said outfeed station;

removing stacks of articles from said infeed station for discharge into a tray located in said working station;

discharging said stacks of articles removed from said infeed station to said tray located in said working station;

removing stacks of articles from said tray located in said working station, and placing said stacks of articles removed from said tray located in said working station into said outfeed station;

wherein said discharging of stacks of articles into a tray and said removing of stacks of articles from a tray take place simultaneously with respect to the same said tray in said working station.

12. A method according to claim 11 and further including the steps of removing a full tray from said working station and placing an empty tray at said working station in the event the rate of supply of articles from said infeed station exceeds the rate of demand for articles at said outfeed station.

13. A method according to claim 11 and further including the steps of removing an empty tray from said working station and placing a full tray in said working station in the event the rate of demand for articles at said outfeed station exceeds the rate of supply of articles at said infeed station.

14. A method according to claim 12 and further including the steps of removing an empty tray from said working station and placing a full tray in said working station in the event the rate of demand for articles at said outfeed station exceeds the rate of supply of articles at said infeed station.

15. A method according to claim 11 and further including providing a tray storage station adjacent the working station;

engaging a selected tray located in said tray storage station, elevating said selected tray by a predetermined distance sufficient to permit one of insertion of another tray and removal of another tray from beneath said selected tray;

performing one of inserting a tray or removing a tray from beneath said selected tray;

lowering said selected tray to a stationary rest position, and releasing the engagement with said selected tray.

* * * * *